United States Patent [19]
Donze et al.

[11] Patent Number: 5,026,079
[45] Date of Patent: Jun. 25, 1991

[54] BALANCED MULTI-WHEEL WHEELBARROW

[76] Inventors: Pierre Donze, "Clos Varegues" St. Andrieux, 76930 Octeville/Mer; Jean P. Frank, 3 rue des Songes, 68850 Staffelfelden, both of France

[21] Appl. No.: 532,236

[22] Filed: Jun. 4, 1990

Related U.S. Application Data

[63] Continuation of Ser. No. 369,836, Jun. 22, 1989, abandoned, which is a continuation of Ser. No. 313,754, Feb. 22, 1989, abandoned, which is a continuation of Ser. No. 208,242, Jun. 17, 1988, abandoned, which is a continuation of Ser. No. 117,983, Nov. 9, 1987, abandoned, which is a continuation of Ser. No. 912,071, Sep. 25, 1986, abandoned.

[30] Foreign Application Priority Data

Sep. 25, 1985 [FR] France ................................ 85 14194

[51] Int. Cl.$^5$ ................................................ B62B 1/18
[52] U.S. Cl. ............................ 280/47.31; 280/47.33; 280/47.315
[58] Field of Search ............ 280/47.31, 47.33, 47.315; 298/2, 3

[56] References Cited

U.S. PATENT DOCUMENTS

| | | | |
|---|---|---|---|
| 241,148 | 5/1881 | Marsh | 280/47.31 |
| 385,381 | 7/1888 | Spalding | 280/47.31 |
| 562,139 | 6/1896 | McCabe | 280/47.31 |
| 772,253 | 10/1904 | Ray | 280/47.31 |
| 1,325,557 | 12/1919 | Cummins | 280/47.31 |
| 1,516,856 | 11/1924 | Johnson | 280/47.31 |
| 3,248,128 | 4/1966 | Grable et al. | 280/47.31 |
| 3,404,427 | 10/1968 | Mack | 280/47.31 |
| 4,190,260 | 2/1980 | Pearce | 280/47.31 |

FOREIGN PATENT DOCUMENTS 543028 12/1955 Belgium ........................... 280/47.31

*Primary Examiner*—David M. Mitchell
*Attorney, Agent, or Firm*—Lane, Aitken & McCann

[57] ABSTRACT

A wheelbarrow comprising a frame having two arms defining handles, supporting legs, a load container and wheel support structure. The center of gravity of the container is located substantially in vertical alignment with the axle in the operative position of the wheelbarrow. The axis is removably mounted in bearing. An abutment member is disposed at the front end of the wheelbarrow and extends transversely to each side of the longitudinal centerline of the wheelbarrow defines with a forward edge of the container a stable vertical storage position of the wheelbarrow. The wheel axle is adapted to accommodate different wheel arrangements for use on different kinds of ground or terrain.

13 Claims, 2 Drawing Sheets

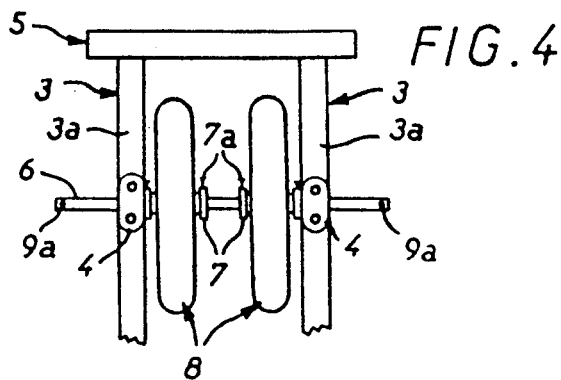
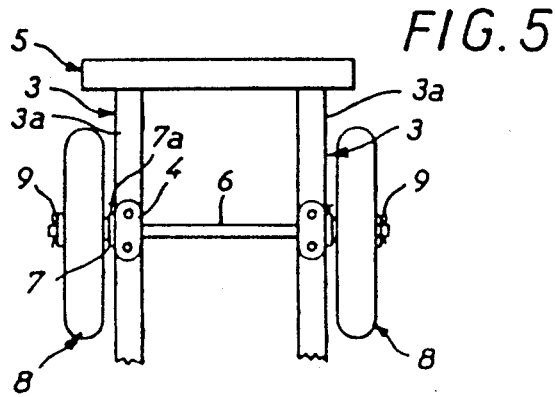
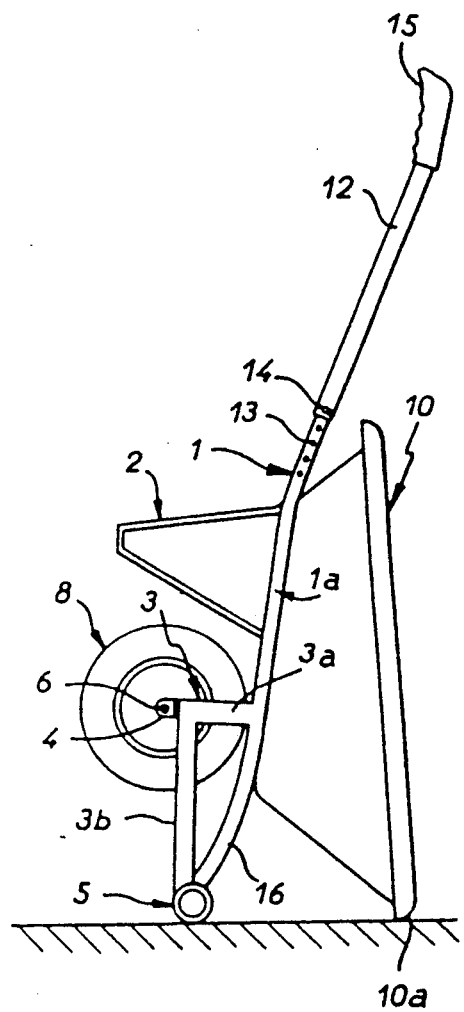
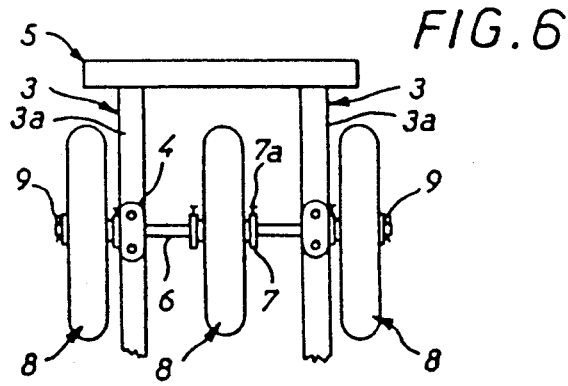
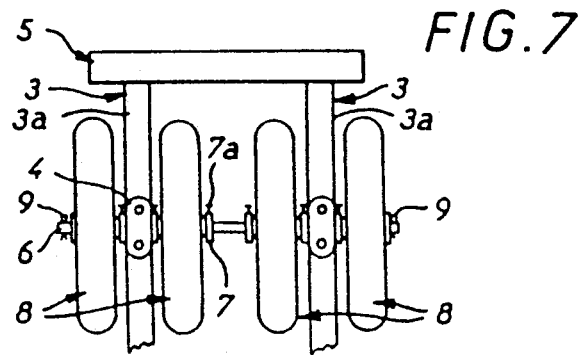

BALANCED MULTI-WHEEL WHEELBARROW

This application is a continuation of application Ser. No. 369,836, filed June 22, 1989, which is a continuation of application Ser. No. 313,754, filed Feb. 22, 1989, which is a continuation of application Ser. No. 208,242, filed June 17, 1988, which is a continuation of application Ser. No. 117,983, filed Nov. 9, 1987, which is continuation of application Ser. No. 912,071, filed Sept. 25, 1986, all of which are now abandoned.

BACKGROUND OF THE INVENTION

The present invention relates to wheelbarrows for transporting relatively small loads.

Conventional wheelbarrows comprise a frame with two spaced arms defining handles, supporting legs and a wheel assembly located at the forward end of the wheelbarrow.

This type of wheelbarrow has a number of drawbacks for the user. First of all, the user must lift and carry at least about one-third of the load because of the location of the bearing zone of the wheel or wheels of the wheel assembly on the ground. Another drawback is relates to the fact that since the wheel assembly is determined or fixed, the wheelbarrow is inconvenient on certain types of ground or terrain (i.e., grass, gravel, sand or mud). Finally, known wheelbarrows have only a single stable position which is defined by the supporting legs. It is, however, often inconvenient to store a wheelbarrow in this position.

The various drawbacks of prior art wheelbarrows are disclosed namely in British patent Nos. 6,788 and 608,297 and U.S. Pat. Nos. 1,572,531 and 4,252,334. In all these prior art devices the wheel assembly and the container or barrow have a relative position such that the center of gravity of the barrow is always longitudinally offset relative to the wheel assembly which precludes proper balance of the wheelbarrow. Moreover, no means has been proposed to adapt a wheelbarrow to different kinds of ground or terrain.

An object of the invention is to overcome the various above-mentioned drawbacks.

SUMMARY OF THE INVENTION

According to the invention there is provided a wheelbarrow comprising a frame having two arms defining handles, supporting legs, a load container and a wheel support structure including a wheel axle characterized in that the center of gravity of the container is located substantially in vertical alignment with the axle in the operative position of the wheelbarrow, the axle being removably mounted in two bearings, and an abutment member disposed at the front of the wheelbarrow and extending transversely to each side of the longitudinal center line of the wheelbarrow.

According to another feature of the invention, the wheel axle is adapted to accomodate different arrangements of wheels, stop means for releasably securing the wheels of a selected wheel arrangement in position on the axle.

According to another aspect of the invention, the abutment member is suitably aligned with the forward edge of the container to define a stable storage position in which the abutment member and the front edge bear on the ground.

The present wheelbarrow has numerous advantages. It has a normal operating position in which the force necessary for lifting and transporting the load is minimized due to the substantially vertically aligned position of the wheel axle relative to the center of gravity of the container. It is adaptable to all kinds of ground or terrain since it may be equipped with different wheel arrangements with the wheels positionable at desired locations on the axle and easily demountable. In view of its forward abutment member it permits easy discharge of the load both forwardly and laterally and defines a novel stable storage position which reduces its storage surface area and facilitates cleaning of the barrow and maintenance and changing of the wheel arrangement.

DESCRIPTION OF THE DRAWINGS

These and other features and advantages will become apparent from the description which follows with reference to the accompanying drawings given by way of example.

FIGS. 4 through 7 are respective partial bottom plan views for four different wheel arrangements; and FIG. 8 is a side elevational view showing the wheelbarrow in its vertical storage position.

DETAILED DESCRIPTION OF THE PREFERRED EMBODIMENT

Figure 1:
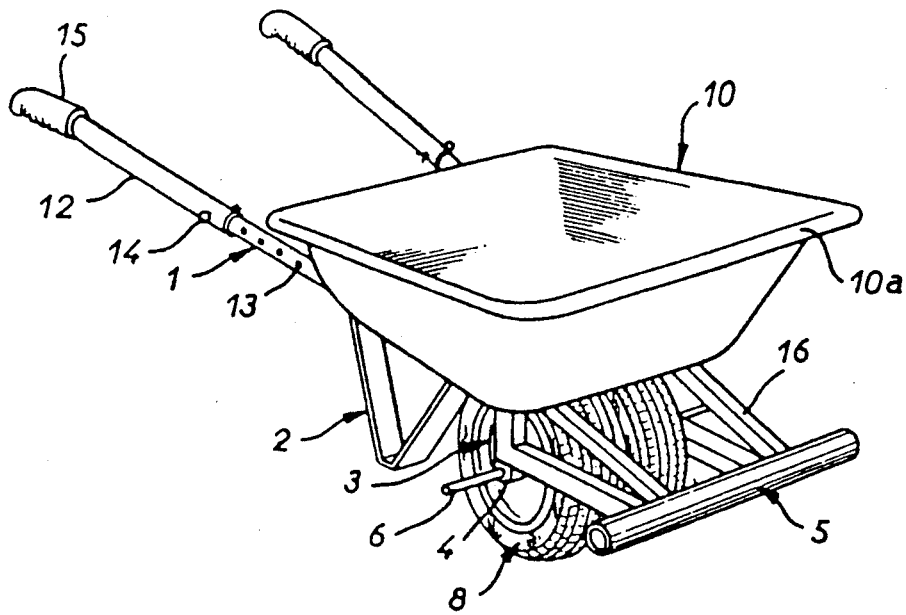
FIG. 1 is a perspective view of the wheelbarrow embodying the present invention.
Figure 2:
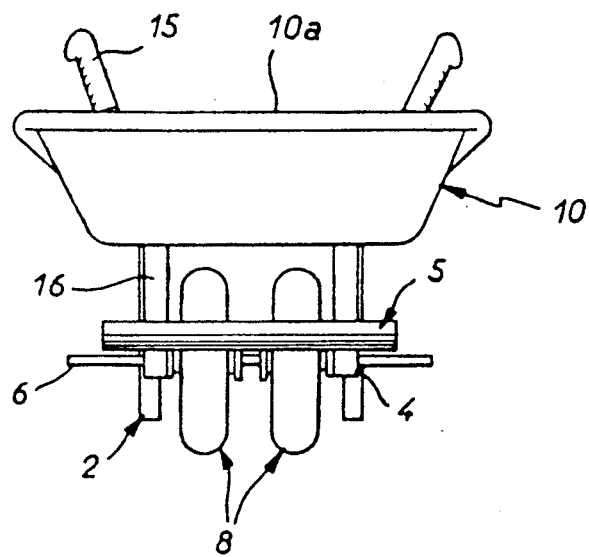
FIG. 2 is a front end elevational view of the wheelbarrow of FIG. 1.
Figure 3:
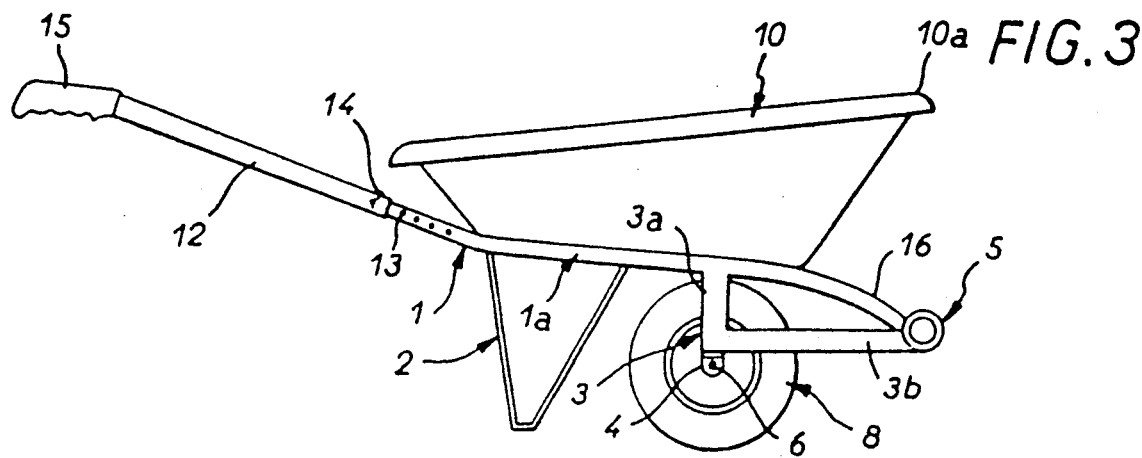
FIG. 3 is a side elevational view of the wheelbarrow of FIG. 1.

Reference will be first had to FIGS. 1 through 3 which show the wheelbarrow comprising a chassis or frame 1a, two arms 1 defining handles, supporting legs 2, a load container 10 and a wheel support structure including a wheel axle 6 supporting two wheels 8. The two arms 1 defining handles extend from the frame 1a are angled outwardly and upwardly and terminate by two hand grips 15 which are generally parallel to the ground when the wheelbarrow is in its horizontal rest position as illustrated in FIG. 3. The container 10 is removably mounted on the frame 1a by means that are not illustrated.

The frame 1a has two substantially parallel arms 16 extending forwardly of the container 10. The free ends of the arms 16 are welded to a transverse abutment member 5 which extends transversely to the respective sides of the arms 16. Arms 16 are slightly bent or curved toward the ground so that the abutment member 5 is located substantially at the same level as the axle 6. The abutment member 5 and the wheel axle are parallel to each other.

The wheel support structure 3 located below the frame 1a includes an angle member having two arms 3a, 3b at each side of the container. The end of first arm 3a is welded to the frame 1a whereas the end of the second arm 3b is welded to the abutment member 5. Each angle member 3 supports a bearing 4 at the intersection of its arms. The bearings 4 are in alignment so as to journal the axle for the wheels 8. The wheel support structure 3 is located under the frame 1a so that the axle 6 is substantially in vertical alignment, that is vertically beneath the center of gravity of the container 10 when the wheelbarrow is in its operative position.

The forward edge 10a of the container 10 is substantially in vertical alignment with the abutment member 5 in the horizontal rest position shown in FIG. 4.

Referring to FIG. 2 it is noted that the axle extends beyond the two bearings 4 so as to be adapted to support at least one outer wheel adjacent each of the ends of the axle 6 and so that the transverse abutment member 5 is substantially as long as or slightly longer than the axle 6 whereby the hubs of such outer wheels are substantially in alignment with the free ends of the axle 6 as seen in FIGS. 5 through 7.

The frame 1a has two supporting legs 2. In the illustrated embodiments each supporting leg 2 is generally V-shaped. The base of the V-shaped legs 2 define bearing surfaces and the free ends of the V-shape are joined, for example welded, to the frame 1a.

Reference will now be had to FIGS. 4 through 7 which shown in detail the various wheel arrangements. In these various wheel arrangements the wheels 8 are always freely mounted for rotation by means of ball bearings and slidably mounted on the axle 6 for adjusting the position and spacing of the wheels. Once the lateral position of each wheel 8 has been selected, their position may be secured by the intermediary of releasable sliding stop means being fixed in position by screws 7a for example.

In the FIG. 4 embodiment the axle 6 carries two wheels 8 located between two bearings 4. Each wheel 8 is held in position on the axle 6 by the intermediary of releasable sliding stop means 7 which are located in the vicinity of the bearings 4.

In the FIG. 5 embodiment two such wheels 8 are mounted outside the bearings 4 on the terminal or outside portions of the axle 6. Each of the wheels 8 is in this instance held by a cotter pin 9 received in a through hole 9a located proximate to the corresponding end of the axle 6. Inwardly of the wheels 8 are stop means 7 bearing against the adjacent bearing 4. The same arrangement is provided in the FIG. 6 embodiment where a third wheel 8 is located by two spaced stop means 7 at the middle of the shaft 6.

In FIG. 7 the shaft 6 carries two inner wheels 8 arranged as shown in FIG. 4 and two outer wheels 8 arranged as shown in FIG. 6.

The various wheel arrangements of FIGS. 4 through 7 have the advantage of stop means 7 (FIG. 4) and stop means 7 and cotter pins 9 (FIGS. 5 through 7) which maintain the shaft 6 in position without necessitating additional fastening means.

The selection of the various possible wheel arrangements as to number and position of the wheels adapts the wheel assembly of the wheelbarrow to various conditions of use and particularly to different kinds of ground or terrain. In case of a loose ground such as gravel the three-wheel configuration of FIG. 6 can be advantageously adopted. The four-wheel arrangement can be adopted for use on grounds which are more difficult such as mud or grass and the like.

FIG. 8 illustrates the vertical storage position of the wheelbarrow in which the wheelbarrow bears on its abutment member 5 and the forward edge 10a of the container 10. This storage position facilitates in particular cleaning of the container, maintenance, adjustment and changing of the wheels. The abutment member 5 offers the great additional advantage of facilitating the discharge of the load both forwardly and sideways with minimum force and maximum security because of the fulcrum defined by the abutment member. It will be understood that for lateral or sideways discharge of the container 10 the corresponding end of the abutment member 5 defines the bearing support or fulcrum.

The handles are preferably of the telescopic variety. To this end each handle has a tubular member 12 slideably mounted on each fixed arm 1. The tubular members 12 and the arms 1 are provided with registrable holes 12 so as to permit the tubular members 12 to be fixed relative to the arms 1 by the agency of cotter pins 14 for example. The telescopic adjustment of the length of the tubular members 12 permits the height or position of the hand grips 15 to be adjusted depending on the stature of the user so as to avoid an uncomfortable working position.

It will be understood from the foregoing description that the present invention combines a number of advantages which has the effect of increasing the user's efficiency while improving his comfort. They include:

reducing the maximum weight to be lifted by the user;

making the wheelbarrow adaptable to the nature of the ground or terrain on which it is to be used;

stabilizing the discharge positions of the wheelbarrow; and facilitating cleaning and maintenance of the wheelbarrow as well as its storage.

It will be understood that the invention is not intended to be limited to the details of the particular embodiments given by way of example. Rather, various alternatives and modifications may be made within the scope of the inventions as defined by the appended claims. Thus, the releasable stop means may be of various type of configurations. Different types of handles may be contemplated in lieu of the telescopic handles. Welded connections may be replaced by releasable fastening means in particular for the supporting legs.

What is claimed is:

1. A wheelbarrow comprising:
   a frame having two sides;
   a container mounted on said frame, said container having a forward edge and two side edges;
   bearings secured to said frame for receiving an axle;
   an axle removably secured in said bearings;
   a plurality of wheels mounted on said axle;
   arms extending rearwardly from said frame, said arms having handles for grasping by a user;
   supporting legs depending from said frame to support said wheelbarrow, in cooperation with said wheels, in a static position; and
   an elongate abutment member connected to said frame, said abutment member being transverse to the direction of travel of the wheelbarrow, in vertical alignment with the forward edge of the container, and in substantial horizontal alignment with said axle, said abutment member extending laterally beyond the side of said frame and beyond a line extending from the ground-engaging portion of the wheel closest to said side of said frame and the closer side edge of the container,
   whereby said abutment member serves as a fulcrum for tipping the wheelbarrow, selectively, forward and to the side to empty the wheelbarrow.

2. The wheelbarrow of claim 1, wherein the abutment member is a tube.

3. The wheelbarrow of claim 1, wherein the wheels are between the sides of said frame.

4. The wheelbarrow of claim 1, wherein the center of gravity of the container is substantially in vertical alignment with the axle.

5. The wheelbarrow of claim 1, further comprising means for adjusting the height of the handles above a surface supporting the wheelbarrow.

6. The wheelbarrow of claim 5, wherein said arms extend from said frame at an oblique angle with respect to the supporting surface when the wheelbarrow is in its static position, said handles are telescopically mounted with respect to said arms, and said height adjusting means comprises means for fixing said handles at selective amounts of telescoping relative to said arms.

7. The wheelbarrow of claim 1, wherein said axle extends laterally beyond said frame a distance sufficient to mount wheels on said axle laterally outside said frame, wheels also being mountable on said axle and laterally within said frame, said wheels being slidably mounted on said axle; and said wheelbarrow further comprises means for securing said wheels in positions on said axle selected from a larger number of positions, both laterally within and laterally outside said frame, in which said wheels can be secured.

8. The wheelbarrow of claim 1, wherein there are two said handles, said handles being positioned laterally inward of said side edge of the container by a distance sufficient to accommodate the hands of a user laterally inward of said side edges of the container.

9. The wheelbarrow of claim 1, wherein, when the forward edge of said container and said abutment member engage a supporting surface, the center of gravity of the wheelbarrow lies between vertical planes parallel to the forward edge and the abutment member, whereby the wheelbarrow is stably supported in a storage position.

10. The wheelbarrow of claim 1, wherein said axle extends laterally beyond said frame by a distance sufficient to mount wheels on said axle laterally outside said frame.

11. The wheelbarrow of claim 7, wherein said wheel securing means includes stop devices slidable on said axle and releasably fixable at selected positions along said axle.

12. The wheelbarrow of claim 11, wherein the stop devices include screws.

13. A wheelbarrow comprising:

a frame having two sides;

a container mounted on said frame, said container having a forward edge and two side edges;

bearings secured to said frame for receiving an axle;

an axle removably secured in said bearings;

a plurality of wheels mounted on said axle;

arms extending rearwardly from said frame, said arms having handles for grasping by a user;

supporting legs depending from said frame to support said wheelbarrow, in cooperation with said wheels, in a static position; and an elongate abutment member connected to said frame, said abutment member being transverse to the direction of travel of the wheelbarrow, in vertical alignment with the forward edge of the container, and in substantial horizontal alignment with said axle, wherein the center of gravity of the container is substantially in vertical alignment with the axle.

* * * * *